(12) United States Patent
Morita (10) Patent No.: US 6,979,014 B2
(45) Date of Patent: Dec. 27, 2005

(54) BODY FRAME STRUCTURE FOR BICYCLE

(75) Inventor: Kenji Morita, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 7 days.

(21) Appl. No.: 10/401,787

(22) Filed: Mar. 31, 2003

(65) Prior Publication Data

US 2003/0227156 A1 Dec. 11, 2003

(30) Foreign Application Priority Data

Apr. 22, 2002 (JP) .............................. 2002-119426

(51) Int. Cl.$^7$ ............................................ B62K 19/00
(52) U.S. Cl. ................................ 280/288.1; 280/288.2
(58) Field of Search ............................... 280/283, 284, 280/281.1, 275, 274, 288.3, 288.2

(56) References Cited

U.S. PATENT DOCUMENTS

| | | | | |
|---|---|---|---|---|
| 2,280,801 A | * | 4/1942 | Dempsey et al. | ........... 280/284 |
| 4,094,375 A | * | 6/1978 | Doncque | .................... 180/219 |
| 4,327,930 A | * | 5/1982 | Tominaga et al. | .......... 280/284 |
| 4,363,375 A | * | 12/1982 | Kamiya | ....................... 180/227 |
| 4,753,314 A | * | 6/1988 | Tsukiji | ....................... 180/227 |
| 5,375,677 A | * | 12/1994 | Yamagiwa et al. | ......... 180/219 |
| 5,911,429 A | | 6/1999 | Shiau | |
| 2003/0193164 A1 | * | 10/2003 | Parigian | ..................... 280/284 |
| 2004/0061305 A1 | * | 4/2004 | Christini | ..................... 280/284 |

FOREIGN PATENT DOCUMENTS

| | | |
|---|---|---|
| DE | 407969 C | 1/1925 |
| FR | 2480699 A | 10/1981 |
| GB | 2117333 A | 10/1983 |
| JP | 62238180 A | 10/1987 |
| JP | 2-11484 | * 1/1990 |
| JP | 2-14989 | * 1/1990 |
| JP | 4043834 | 2/1992 |
| JP | 9-263282 A | 10/1997 |

* cited by examiner

*Primary Examiner*—Anne Marie Boehler
(74) *Attorney, Agent, or Firm*—Birch, Stewart, Kolasch & Birch, LLP (57) ABSTRACT

A body frame for a vehicle includes a head pipe on which a front fork is mounted for permitting a turning movement. A box-shaped box frame portion extends obliquely rearward and downwards from the head pipe. A twin tube portion extends obliquely downward and rearward on the left and right sides from a rear end of the box frame portion. The twin tube portion has a smaller width than the width of the box frame portion. A rear frame portion extending obliquely rearward and downward from the rear ends of the twin tube portion has a greater width than the width of the twin tube portion. Accordingly, the body frame can be formed such that it has a high rigidity in the proximity of the head pipe but has a low rigidity at a central portion of the body. Accordingly, a load transmitted from the road surface to the head pipe through the front wheel and the box frame portion can support the front fork. Further, since the rear frame portion is formed with an increased width, twisting of the swing arm can be reduced the steering of the vehicle is improved.

20 Claims, 8 Drawing Sheets

BODY FRAME STRUCTURE FOR BICYCLE

CROSS-REFERENCES TO RELATED APPLICATIONS

This nonprovisional application claims priority under 35 U.S.C. § 119(a) on Patent Application No. 2002-119426 filed in Japan on Apr. 22, 2002, the entirety of which is herein incorporated by reference.

BACKGROUND OF THE INVENTION

1. Field of the Invention

The present invention relates to a body frame structure for a bicycle, and more particularly to a body frame structure suitable to augment the steering performance of the vehicle and support a high load applied to the body frame.

2. Description of the Background Art

Body frame structures for a bicycle, such as those described in (1) the official gazette of Japanese Patent Laid-open No. Hei 9-263282 "Bicycle Frame with a Buffer Apparatus" and (2) the official gazette of Japanese Patent Publication No. Hei 4-43834 "Frame for a Motorcycle," have been available in the background art.

In FIG. 1 of document (1) mentioned hereinabove, a triangular frame is disclosed wherein an upper pipe 2 and a lower pipe 3 positioned on the lower side of the upper pipe 2 extend obliquely rearward and downward from a head pipe 1. An upright pipe 4 is connected to a rear end of the upper pipe 2 and a rear end of the lower pipe 3.

In FIG. 1 of the document (2) mentioned hereinabove, a motorcycle is described which includes a main frame member 5 extending obliquely rearward and downward from a head pipe 2, a rear arm 10 mounted at a rear end of the main frame member 5, and a hydraulic shock absorber 31 mounted on and between the main frame member 5 and the rear arm 10 through a link.

However, the present inventor has determined that the background art suffers from the following disadvantages. In the structure described in document (1), since each of the pieces of the triangular frame, which is formed from the upper pipe 2, lower pipe 3, and upright pipe 4, have a fixed outside dimension from one end to the other end thereof, the rigidity is substantially fixed at any portion of the pipe.

As the rigidity of a body frame increases, the distortion or twist of the body frame decreases. Therefore, this is advantageous to a high load transmitted thereto from the road surface and also the sensitivity of the body frame to increases in load. However, if the rigidity of the body frame is excessively high, e.g., when the body frame is acted upon by an impact load from the load surface, the body frame reacts quickly to the impact load. Therefore, the driver is liable to get tired because the driver is forced to react with the movement of the body. Further, since the body frame is less likely to undergo twisting, a good turning characteristic is not obtained.

In contrast, if the rigidity of the body frame is excessively low, then an excessively great twist of the body may occur or precise road surface information is not likely to be conveyed to the driver. Accordingly, since the body frame reacts poorly to the movement of the driver, it is difficult to undertake quick motion.

For example, in a downhill race where bicycles run on considerably rough roads along corners at high speed, it is desirable for the body frame to include a portion having a high rigidity and another portion having a low rigidity for the reasons described hereinabove. With respect to the triangular frame of the document (1) described hereinabove, it is difficult to satisfy both the supporting of a high load and the augmentation of the steering performance.

Meanwhile, with the structure described hereinabove in document (2), if the rear arm 10 swings upward and downward, then a bending load acts upon an intermediate portion of the main frame member 5 from the rear arm 10 through the link and the hydraulic shock absorber 31. Accordingly, the rigidity of the main frame member 5 must be increased to adequately withstand the bending load. However, if the rigidity of the main frame member 5 is increased, then the weight of the body is increased and the performance of the bicycle is deteriorated.

SUMMARY OF THE INVENTION

The present invention overcomes the shortcomings associated with the background art and achieves other advantages not realized by the background art.

The present inventor has determined that if a load transmitted from the rear frame 10 described above to the main frame member 5 can be transmitted as a load in an axial direction of the main frame member 5, then the main frame member 5 can support higher loads from the rear frame 10. Accordingly, a reduction in weight ca be achieved and the performance is improved.

An object of the present invention is to provide a body frame structure for a bicycle that raises steering performance of the vehicle and supports high loading transmitted to a body frame from a front wheel side and a rear wheel side.

One or more of these and other objects are accomplished by a body frame structure for a vehicle comprising a body frame having a front fork at a front portion of the body frame; a swing arm being mounted for an upward and downward swinging movement at a rear portion of the body frame; a head pipe on which the front fork is mounted for permitting a turning movement; a box-shaped box frame portion extending obliquely rearward and downward from the head pipe; a twin tube portion having twin tubes extending obliquely downward and rearward separately on the left and right, respectively from a rear end of the box frame portion, wherein a width of the twin tube portion is smaller than a width of the box frame portion; and a rear frame portion extending obliquely rearward and downward from rear ends of the twin tubes of the twin tube portion, the rear frame portion having a width greater than the width of the twin tube portion.

One or more of these and other objects are further accomplished by a vehicle having a body frame structure, the vehicle comprising a body frame having a front fork at a front portion of the body frame; a swing arm being mounted for an upward and downward swinging movement at a rear portion of the body frame; a front wheel mounted for a steering movement at a front portion of the body frame through the front fork; a rear wheel mounted at a rear end of the swing arm; a head pipe on which the front fork is mounted for permitting a turning movement of the front wheel; a box-shaped box frame portion extending obliquely rearward and downward from the head pipe; a twin tube portion having twin tubes extending obliquely downward and rearward separately on the left and right, respectively from a rear end of the box frame portion, wherein a width of the twin tube portion is smaller than a width of the box frame portion; and a rear frame portion extending obliquely rearward and downward from rear ends of the twin tubes of the twin tube portion, the rear frame portion having a width greater than the width of the twin tube portion.

According to a first characteristic of the present invention, the body frame is formed in the proximity of the head pipe with a box frame portion having a box-like shape such that it has a high rigidity. The box frame portion is divided at the twin tube portion thereof, to the left and right portions of a reduced thickness so as to have a low rigidity, a high load transmitted from the road surface to the head pipe through the front wheel and the front fork can be supported by the box frame portion. Further, a twist can be generated readily at a central portion of the body thereby to augment the steering performance of the vehicle.

According to a second characteristic of the present invention, the swing arm is mounted on the rear frame portion having an increased width in the bicycle widthwise direction, a twisting moment transmitted from the swing arm to the rear frame portion can be received by the two fulcra spaced from each other by a great distance. Consequently, the load to be generated by the twisting moment can be reduced. Where the load acting upon the rear frame portion is reduced in this manner, an increase of the rigidity of the swing arm mounting portion of the rear frame portion can be reduced and an increase of the weight of the rear frame portion can be decreased. Further, since the structure is offsets twisting of the swing arm, good rocking motion of the swing arm, e.g., expansion and compression of the cushion, is obtained.

According to a third characteristic of the present invention, the box frame portion, twin tube portion, rear cushion unit, and rear extension are disposed along a substantially straight line. Therefore, it is possible for the load transmitted from the swing arm to the box frame portion and the twin tube portion through the rear cushion unit to act substantially as an axial compression load on the box frame portion and the twin tube portion. For example, when compared with an alternative case wherein the load transmitted from the swing arm to the body frame acts as a bending load, a higher load can be supported by the body frame.

According to a fourth characteristic of the present invention, the rear cushion unit is disposed below the saddle frame, and the saddle frame and the rear frame portion surround the rear cushion unit. Consequently, the rear cushion unit can be protected from splattering debris and so forth.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention will hereinafter be described with reference to the accompanying drawings. It is to be noted that the drawings should be viewed in the direction corresponding to a proper reading of the reference characters.

Figure 1:
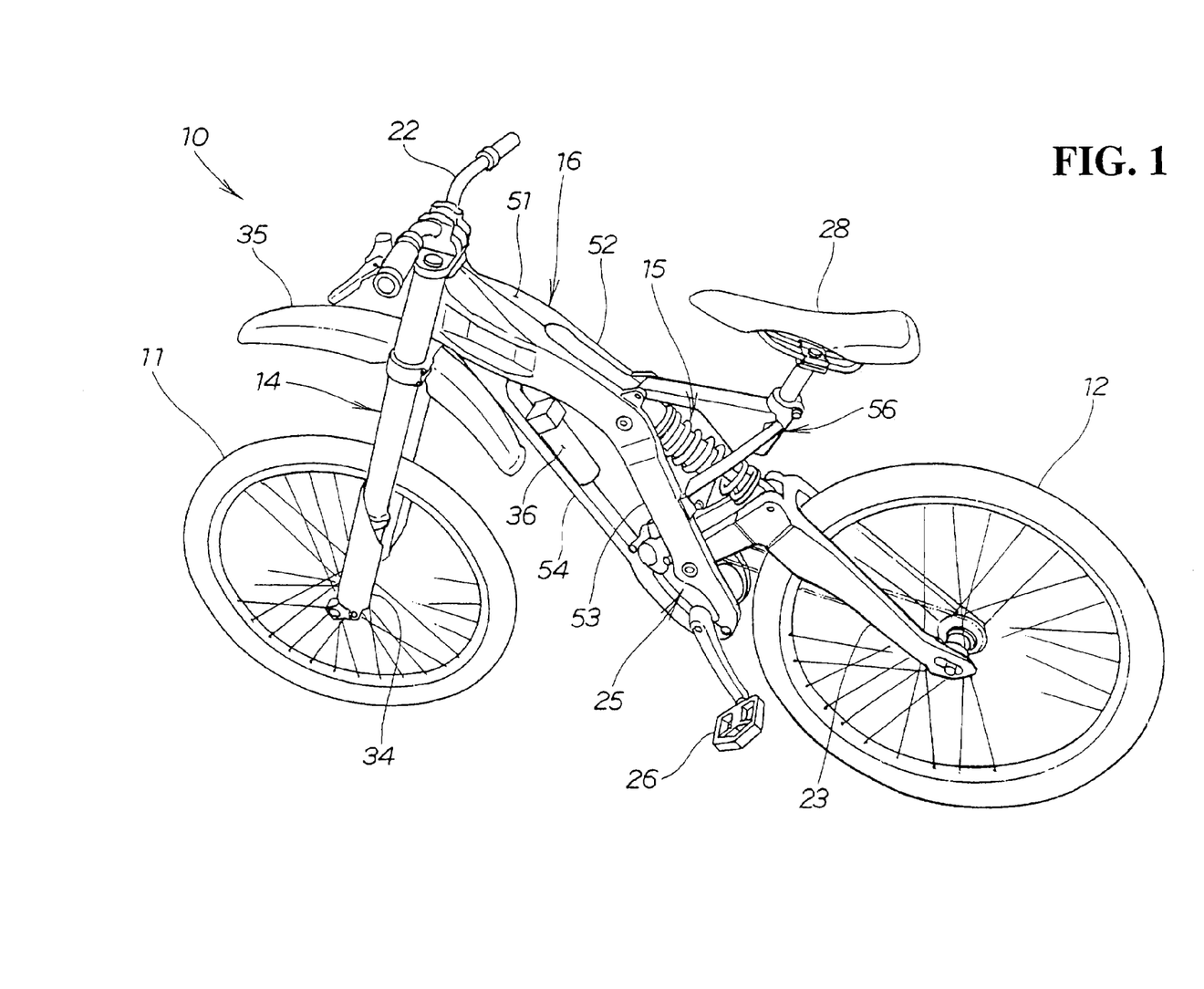
FIG. 1 is a perspective view of a bicycle having a body frame structure according to an embodiment of the present invention.
Figure 2:
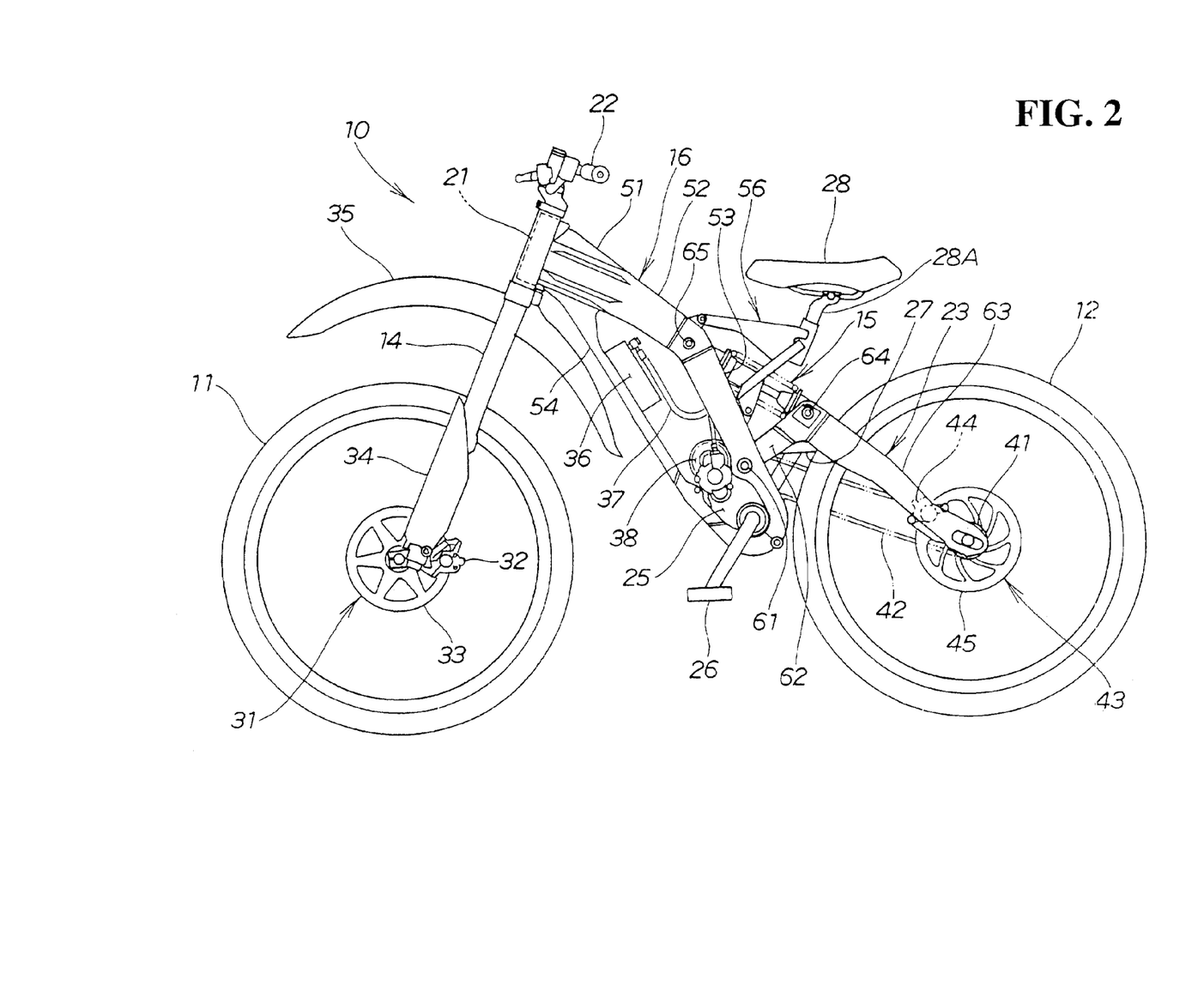
FIG. 2 is a side view of the bicycle according to an embodiment of the present invention.
Figure 3:
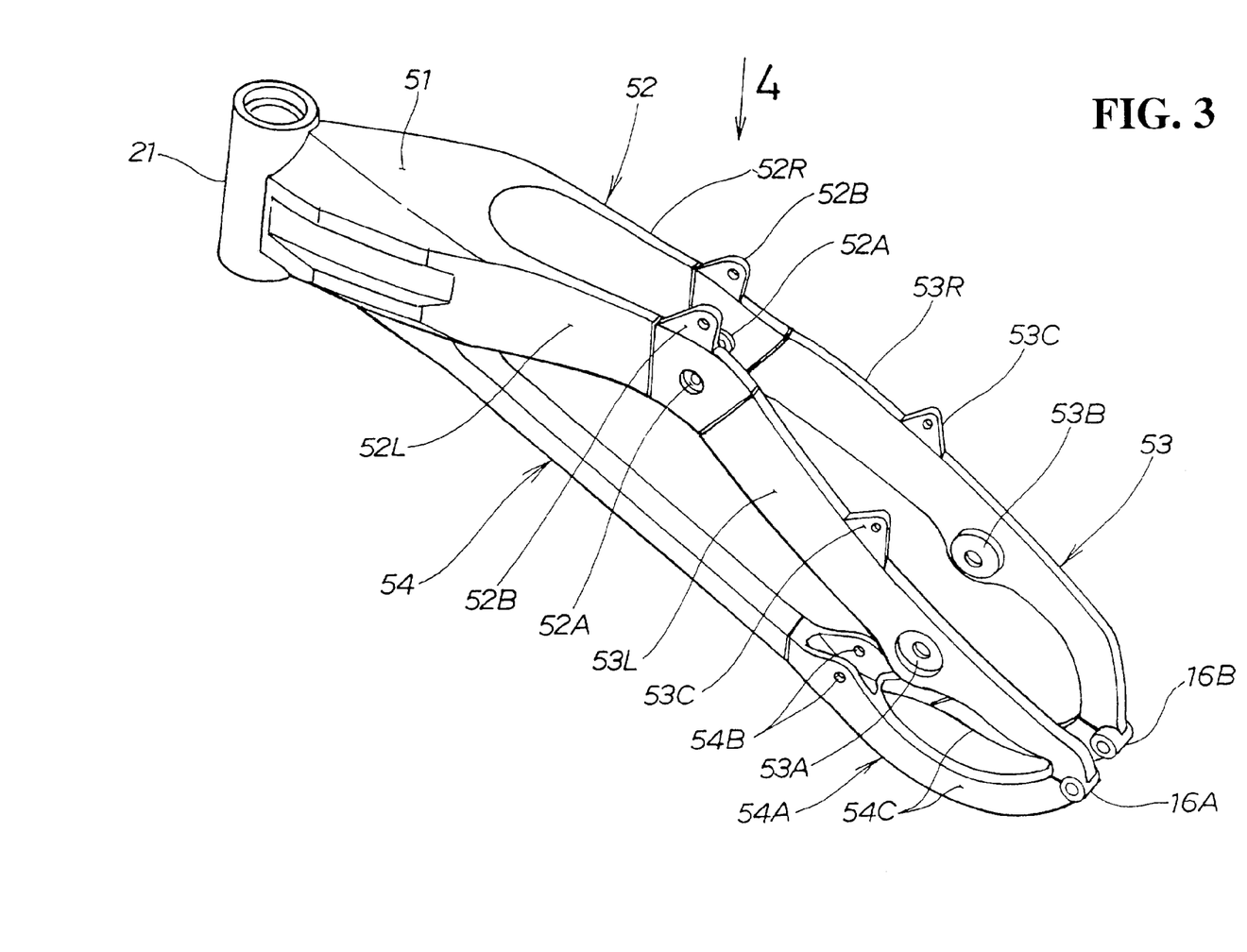
FIG. 3 is a perspective view of a body frame according to an embodiment of the present invention.
Figure 4:
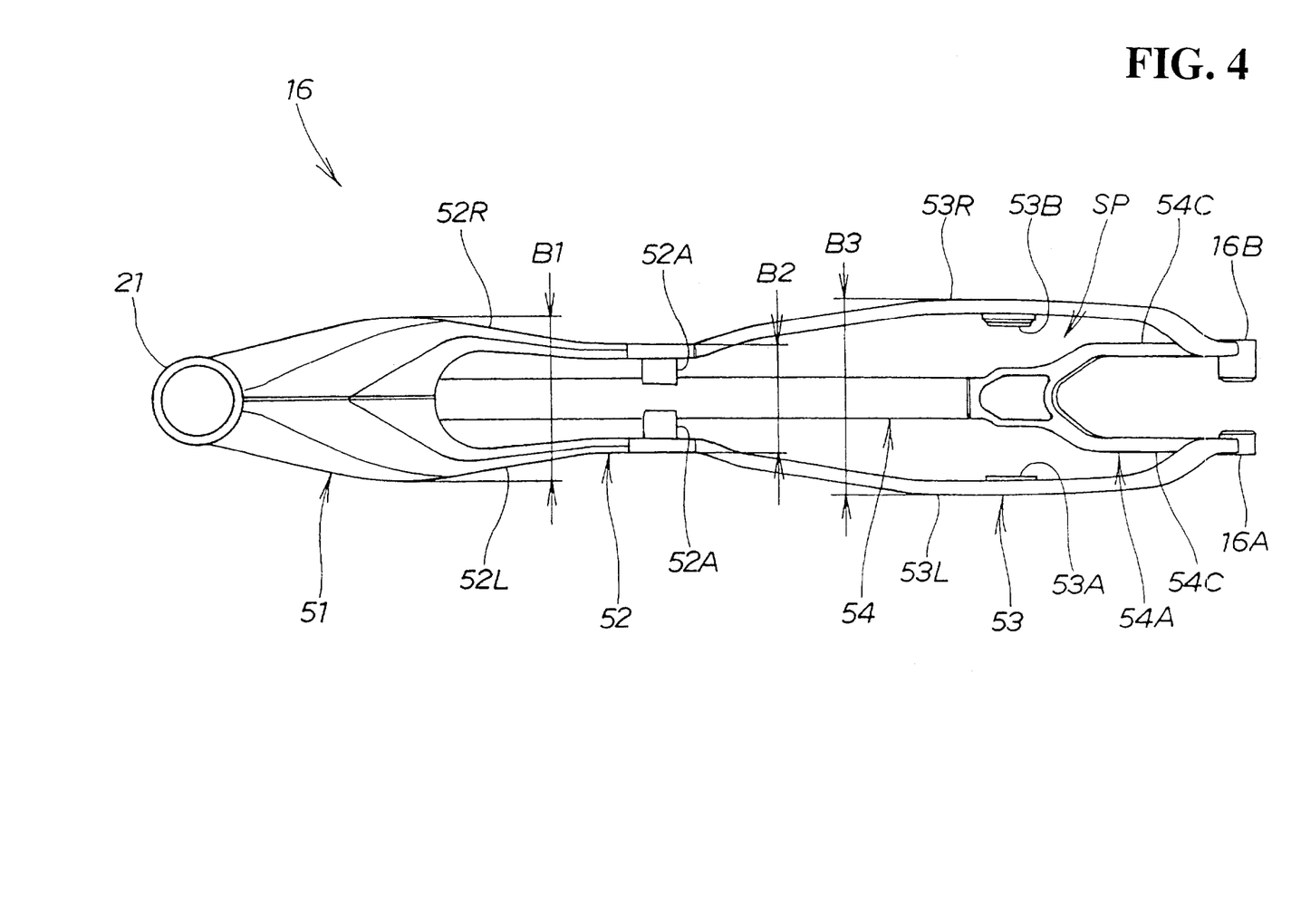
FIG. 4 is a plan view as viewed in the direction of an arrow 4 shown in FIG. 3.
Figure 5:
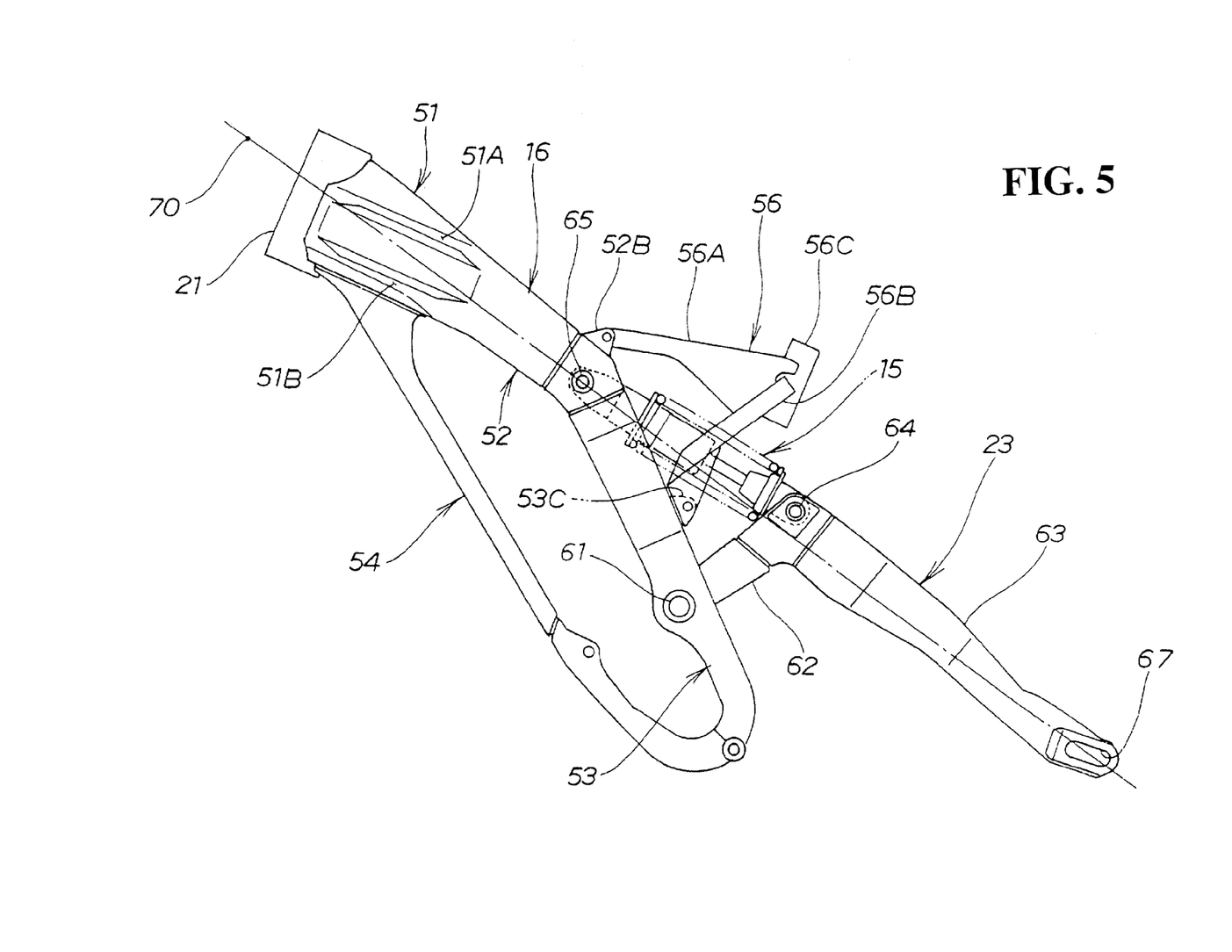
FIG. 5 is a side view showing the body frame structure according to an embodiment of the present invention.
Figure 6:
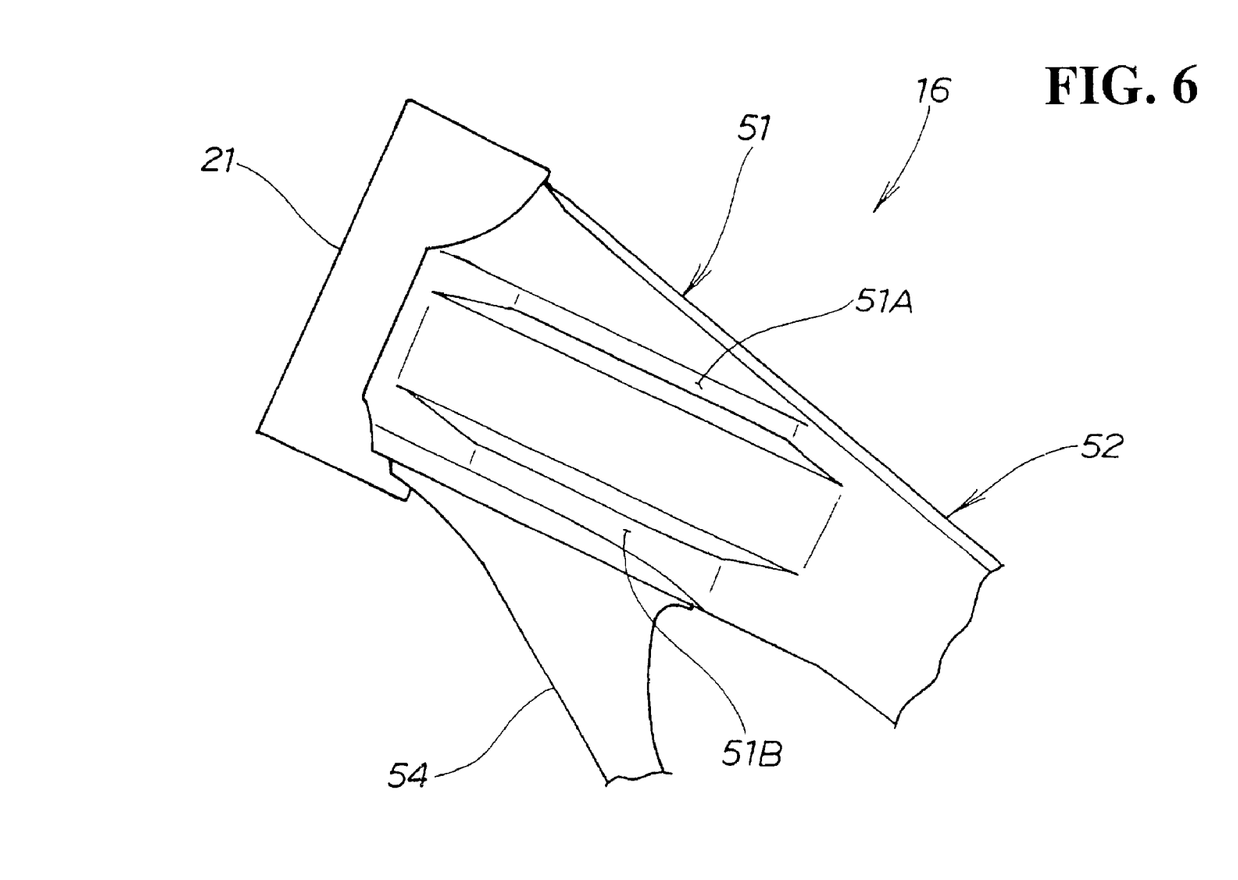
FIG. 6 is a side view showing portions of the body frame according to an embodiment of the present invention.
Figure 7:
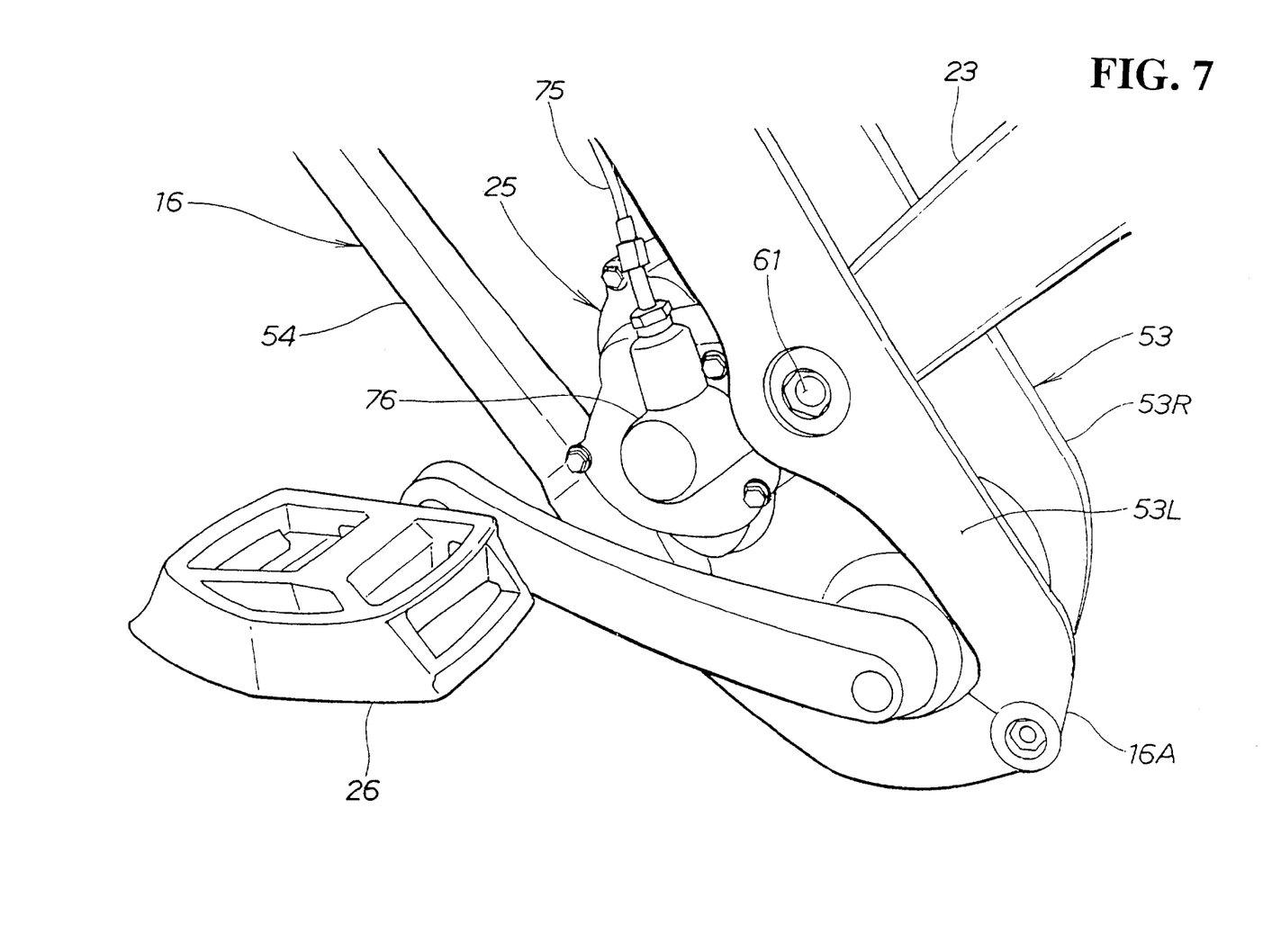
FIG. 7 is a perspective view showing a lower portion of the body frame according to the present invention.
Figure 8:
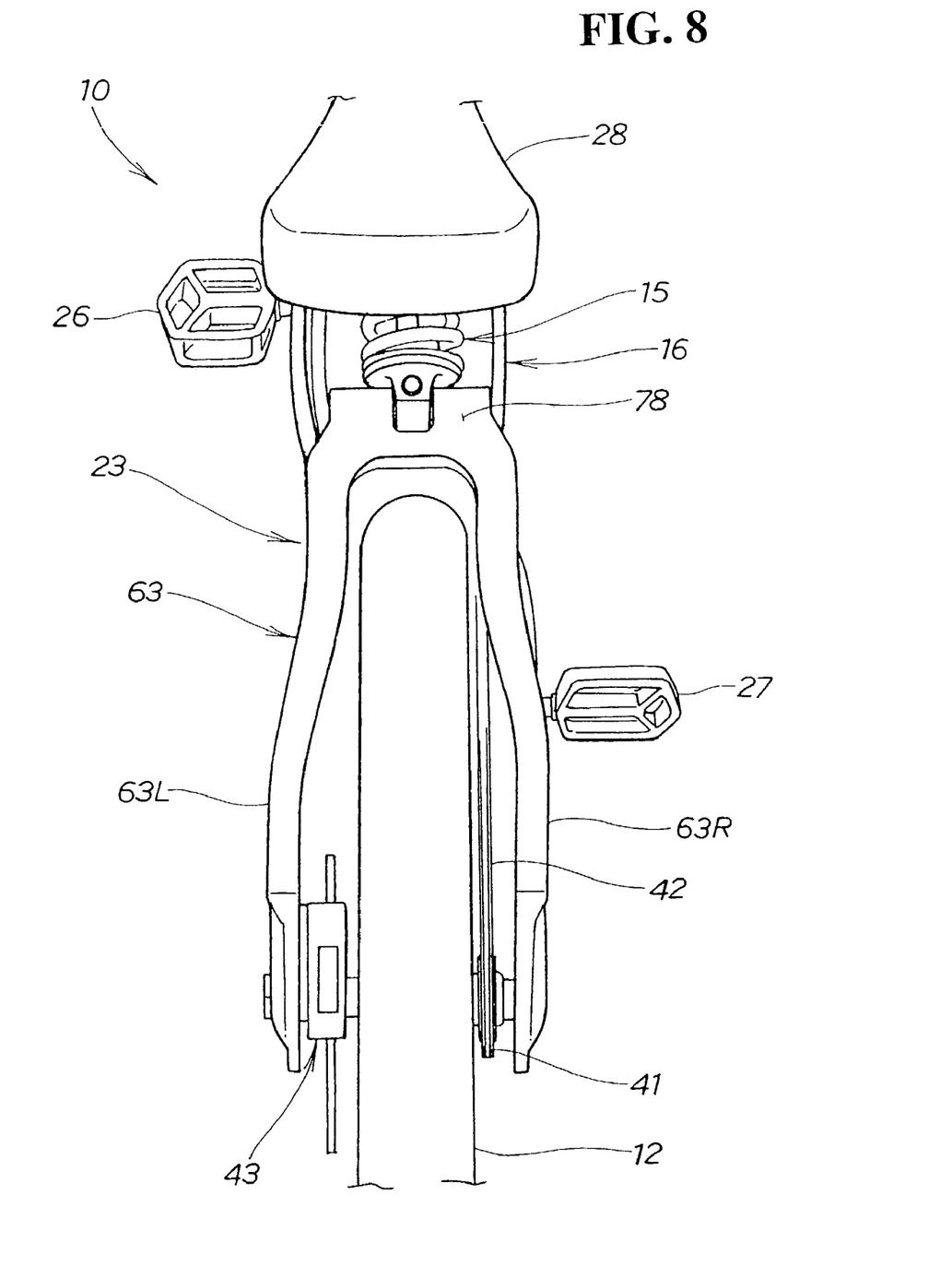
FIG. 8 is a rear view of a rear portion of the bicycle according to the present invention.

FIG. 1 is a perspective view of a bicycle having a body frame structure according to an embodiment of the present invention. FIG. 2 is a side view of the bicycle according to an embodiment of the present invention. FIG. 3 is a perspective view of a body frame according to an embodiment of the present invention. FIG. 4 is a plan view as viewed in the direction of an arrow 4 shown in FIG. 3. FIG. 5 is a side view showing the body frame structure according to an embodiment of the present invention. FIG. 6 is a side view showing portions of the body frame according to an embodiment of the present invention. FIG. 7 is a perspective view showing a lower portion of the body frame according to the present invention. FIG. 8 is a rear view of a rear portion of the bicycle according to the present invention.

FIG. 1 is a perspective view of a bicycle having a body frame structure according to an embodiment of the present invention. The exemplary bicycle 10 is a bicycle for a downhill race. In order to use the bicycle 10 in a competitive, timed downhill race, e.g., wherein bicycles ride along a unpaved course in which high speed corners and jump sections are provided along a woodland path, a ski slope, or the like, an impact from the road surface upon a front wheel 11 and a rear wheel 12 is absorbed by a front fork 14 and a rear cushion unit 15 or shock absorber, respectively. In addition, the rigidity of a body frame 16 is raised to support a high load while flexibility is provided to part of the body frame 16 to raise the steering performance. A disk brake (hereinafter described in detail) is adopted in order to raise the braking force of the front wheel 11 and the rear wheel 12.

FIG. 2 is a side view of the bicycle according to an embodiment of the present invention. The bicycle 10 is a vehicle wherein the front fork 14 described above is mounted for steering movement on a head pipe 21. The front wheel 11 is mounted for rotation at a lower end of the front fork 14 and a handle bar 22 is mounted on an upper portion of the front fork 14. The body frame 16 extends obliquely rearward and downward from the head pipe 21. An L-shaped swing arm 23 is mounted for upward and downward swinging motion at a rear portion of the body frame 16. The rear wheel 12 is mounted for rotation at a rear end of the swing arm 23. The rear cushion unit 15 extends between the body frame 16 and the swing arm 23. A speed change gear 25 is mounted at a rear portion of the body frame 16, a pair of pedals 26 and 27 are mounted on the left and right of the speed change gear 25 and a saddle 28 is mounted at an intermediate portion of the body frame 16.

Further, a front wheel disk brake 31, i.e., having a brake caliper 32 and a brake disk 33, front fork protectors 34 for protecting a lower portion of the front fork 14 (the reference character 34 on the interior side is not shown), a front fender 35, a reservoir tank 36 connected to the rear cushion unit 15 by a hose 37, a driving side sprocket wheel 38 mounted on an output power shaft of the speed change gear 25, a driven sprocket wheel 41 mounted on the rear wheel 12, a chain 42, and a rear wheel disk brake 43, having a brake caliper 44 and a brake disk 45 are also shown in the bicycle 10 in FIG. 2.

FIG. 3 is a perspective view of a body frame according to an embodiment of the present invention. The body frame 16 includes a box frame portion 51 having a box-like shape extending obliquely rearward and downward from the head pipe 21 and a twin tube portion 52 extending obliquely rearward and downward separately on left and right sides from a rear end of the box frame portion 51, e.g., with respect to an extension line of the box frame portion 51. The body frame 16 includes a rear frame portion 53 extending obliquely rearward and downward from rear ends of the twin tube portion 52 at an inclination angle greater than the inclination angle of the box frame portion 51 and the twin tube portion 52, a down tube 54 extending obliquely rearward and downward from a lower portion of a front end of the box frame portion 51 and connected to rear ends of the rear frame portion 53, and a saddle frame 56 (refer to FIG. 2) provided for mounting the saddle 28 (refer to FIG. 2) at the rear ends of the twin tube portion 52 and intermediate portions of the rear frame portion 53. It is to be noted that reference characters 16A and 16B denote cylindrical rear end coupling portions for coupling the connecting portions between the rear ends of the rear frame portion 53 and the rear ends of the down tube 54 on the left and the right each by fasteners such as a bolt.

The box frame portion 51 has a box-like shape so that high rigidity is provided to a front portion of the body frame 16. The twin tube portion 52 is divided into left and right tubes 52L and 52R of a reduced thickness to reduce the rigidity so that a central portion of the body frame 16 may be twisted readily, and includes a pair of cushion mounting portions 52A, 52A for mounting a front end of the rear cushion unit 15 (refer to FIG. 2) or shock absorber on inner faces of the rear ends thereof. Further, the twin tube portion 52 includes a pair of saddle frame front mounting portions 52B, 52B for mounting front portions of the saddle frame 56 at upper portions of rear ends thereof.

The rear frame portion 53 has an increased width in the leftward and rightward direction to facilitate accommodation of the speed change gear 25 (refer to FIG. 2) therein and to increase the supporting force for supporting the twist acting upon the mounting portion of the swing arm 23 (FIG. 2). The rear frame portion 53 includes a pair of left and right frame portions 53L and 53R, and has arm mounting portions 53A and 53B at inner faces of an intermediate portion thereof for mounting the front end of the swing arm 23. The rear frame portion 53 further has a pair of saddle frame rear mounting portions 53C, 53C at upper intermediate portion thereof for mounting a rear portion of the saddle frame 56.

The down tube 54 has a bifurcated portion 54A formed in a bifurcated shape at a rear portion thereof for supporting the speed change gear 25 and connecting the speed change gear 25 to the rear end of the rear frame portion 53, and a pair of speed change gear mounting holes 54B, 54B perforated at root portions of the bifurcated portion 54A for mounting the speed change gear 25. It is to be noted reference characters 54C, 54C denote left and right curved arm portions that form the bifurcated portion 54A.

The box frame portion 51 of a high rigidity is provided in the proximity of the head pipe 21, and the rear frame portion 53 is mounted with an increased width in the bicycle widthwise direction at the mounting portions for the swing arm 23 so that a high rigidity may be provided against a twisting moment from the rear wheel 12 (refer to FIG. 2). At a substantially intermediate portion between the box frame portion 51 and the rear frame portion 53, the twin tube portion 52 of a reduced width in the bicycle widthwise direction is provided so that a middle portion of the bicycle body is twisted by a high load from the front and rear wheels 11 and 12 (refer to FIG. 2) at a position in the proximity of the center of gravity of the bicycle body including the driver. Accordingly, the steering performance can be improved.

FIG. 4 is a plan view as viewed in the direction of an arrow 4 shown in FIG. 3. Where the outside dimensions in the bicycle widthwise direction (hereinafter referred to merely as "widths") of different portions of the body frame 16 are denoted by width B1 at the box frame portion 51, width B2 at the twin tube portion 52, and width B3 at the rear frame portion 53, and the dimensions are described according to the following preferred relationship, B2<B1 and B3>B2.

In particular, the width B2 of the twin tube portion 52 is made smaller than the width B1 of the box frame portion 51 and the width B3 of the rear frame portion 53. As a result, when the driver operates the pedals, the twin tube portion 52 is less likely to interfere with the driver's knees so that the movements of the knees may not be disturbed, and a good pedaling operation can be achieved. Since the width B3 of the rear frame portion 53 is greater than the width B2 of the twin tube portion 52, the space SP between the left and right frame portions 53L and 53R can be increased to facilitate accommodation of parts such as the speed change gear 25 (refer to FIG. 2) into the space SP. Furthermore, since the swing arm 23 (refer to FIG. 2) is supported with an increased width against twisting, good rocking motion of the rear wheel 12 (refer to FIG. 2), e.g., good expansion and compression of the rear cushion unit 15 is obtained.

FIG. 5 is a side view showing the body frame structure according to an embodiment of the present invention. The swing arm 23 is a substantially L-shaped member including an upright portion 62 extending obliquely rearward and upward from a pivot shaft 61 mounted on the rear frame portion 53 and a rear extension 63 extending obliquely rearward and downward from an upper end of the upright portion 62. A mounting shaft 64 at a rear end of the rear cushion unit 15 is attached to a connecting portion between the upright portion 62 and the rear extension 63. It is to be noted that reference numeral 65 denotes a mounting shaft provided on the twin tube portion 52 for mounting a front end of the rear cushion unit 15, and 67 an elongated hole perforated at a rear end of the rear extension 63 for mounting an axle of the rear wheel 12 (refer to FIG. 2).

Since the swing arm 23 has a shape as described above, the body frame structure of the present invention is configured such that the box frame portion 51, twin tube portion 52, rear cushion unit 15, and rear extension 63 are disposed substantially linearly, e.g., along a straight line 70. Accordingly, it is possible for the load transmitted from the rear wheel 12 to the box frame portion 51 and the twin tube portion 52 through the swing arm 23 and the rear cushion unit 15 to act substantially as an axial compression load on the box frame portion 51 and the twin tube portion 52. Therefore, while the load transmitted from the swing arm to the body frame acts as a bending load upon the body frame in the structures of the background art, according to the present invention, higher loads can be supported by the body frame 16 without sacrificing lightweight body frame 51.

The saddle frame 56 includes an upper frame portion 56A mounted on the saddle frame front mounting portions 52B, 53B (the saddle frame front mounting portion 52B on the interior side is not shown) of the twin tube portion 52, a lower frame portion 56B mounted on the saddle frame rear mounting portions 53C, 53C of the rear frame portion 53, and a cylindrical portion 56C to which end portions of the upper frame portion 56A and the lower frame portion 56B are attached. The saddle post 28A (refer to FIG. 2) mounted at a lower portion of the saddle 28 (refer to FIG. 2) is supported by the cylindrical portion 56C. Since the entire saddle frame 56 covers a substantial portion of the upper and side portions of the rear cushion unit 15, the rear cushion unit 15 can be protected from splattering debris, e.g., pebbles and so forth.

FIG. 6 is a side view showing portions of the body frame according to an embodiment of the present invention. Longitudinally extending transverse ribs 51A and 51B are formed above and below in parallel to each other on a side face of the box frame portion 51 of the body frame 16. Where the transverse ribs 51A and 51B are provided on the box frame portion 51 in this manner, the box frame portion 51 can be formed with a higher rigidity in addition to the box-like shape. Accordingly, the material thickness of the box frame portion 51 can be reduced in order to obtain a predetermined rigidity, and the box frame portion 51 can be formed with a further reduced weight.

FIG. 7 is a perspective view showing a lower portion of the body frame according to the present invention. The speed change gear 25 is disposed on the inner side of the rear frame portion 53 having an increased width. The speed change gear 25 is an apparatus connected by a wire 75 to a speed changing lever (not shown) provided on the handle bar 22 (refer to FIG. 2). Changes in speed are accomplished by operating the speed changing lever described above to pull the wire 75 connected to the speed changing lever to activate a connecting portion 76 to which the end portion of the wire 75 is connected. The gear ratio between a pedal shaft which serves as a rotatable shaft of the pedals 26 and 27 (the pedal 27 is not shown) and an output power shaft on which the driving side sprocket wheel 38 (refer to FIG. 2) is mounted integrally and is adjusted by the speed changing lever.

FIG. 8 is a rear view of a rear portion of the bicycle according to the present invention. The rear extension 63 of the swing arm 23 is formed from a pair of left and right arm portions 63L and 63R extending from a connecting portion 78 for connection to the upright portion 62 (refer to FIG. 5). In this manner, the connecting portion 78 is a portion having an augmented rigidity in order to connect the left and right arm portions 63L and 63R. Since the rear end of the rear cushion unit 15 is connected to the connecting portion 78, a load can be transmitted efficiently from the rear wheel 12 to the rear cushion unit 15 through the rear extension 63.

As described with reference to FIGS. 1, 3, and 4, according to the present invention, since the body frame 16 is formed, in the proximity of the head pipe 21, as the box frame portion 51 of a box-like shape such that it has a high rigidity, a high load transmitted from the road surface to the head pipe 21 through the front wheel 11 and the front fork 14 can be supported by the box frame portion 51. Further, since the body frame 16 has an increased width at the rear frame portion 53 thereof which serves as the mounting portion for the swing arm 23, a twist of the swing arm 23 by the load acting upon the rear wheel 12 can be suppressed.

Further, since twist is generated at the twin tube portion 52 (low rigidity portion) positioned at a substantially intermediate portion of the body frame 16, the body frame 16 is deformed in the proximity of the center of gravity thereof. Consequently, the steering performance of the bicycle 10 can be augmented. Further, since the width B2 of the twin tube portion 52 is made smaller than the width B1 of the box frame portion 51 and the width B3 of the rear frame portion 53, it does not interfere with the movements of the knees of the driver when the driver operates the pedals 26 and 27, and a good pedaling operation can be performed and the performance of the bicycle is improved. Furthermore, since the width B3 of the rear frame portion 53 is relatively large, the space SP between the left and right rear frame portions 53 can be increased. Therefore, the accommodation performance of parts such as the speed change gear 25 into the space SP can be augmented. Further, a twist of the swing arm 23 can be suppressed.

According to a second characteristic of the present invention, a pivot shaft 61 serving as a mounting portion for the swing arm 23 is provided at a substantially middle portion of the rear frame portion 53. Since the swing arm 23 is mounted on the rear frame portion 53 having an increased width in the bicycle widthwise direction, the two fulcra spaced from each other by a great distance can receive a twisting moment transmitted from the swing arm 23 to the rear frame portion 53. Consequently, the load generated by the twisting moment can be reduced. Where the load acting upon the rear frame portion 53 is reduced in this manner, an increase of the rigidity of the swing arm mounting portion of the rear frame portion 53 can be reduced and an increase of the weight of the rear frame portion 53 can be suppressed.

According to a third characteristic of the present invention the swing arm 23 is a substantially L-shaped member having an upright portion 62 extending obliquely rearward and upward from the pivot shaft 61 and a rear extension 63 extending obliquely rearward and downward from an upper end of the upright portion 62. A connecting portion 78 between the upright portion 62 and the rear extension 63 is connected to the rear end of the twin tube portion 52 of the body frame 16 through a rear cushion unit 15 for damping an impact to be transmitted from the rear wheel 12 to the body frame 16 such that the box frame portion 51, twin tube portion 52, rear cushion unit 15, and rear extension 63 are disposed along the same substantially straight line.

Since the box frame portion 51, twin tube portion 52, rear cushion unit 15, and rear extension 63 are disposed along the same substantially straight line, it is possible for the load transmitted from the swing arm 23 to the box frame portion 51 and the twin tube portion 52 through the rear cushion unit 15 to act substantially as an axial compression load on the box frame portion 51 and the twin tube portion 52. For example, when compared with an alternative case wherein the load transmitted from the swing arm to the body frame acts as a bending load, according to the present invention, a higher load can be supported by the body frame 16.

Accordingly, by changing the direction of the load to act upon the body frame 16 in addition to the increase of the rigidity of the body frame 16 by the box frame portion 51 described above, a higher load from the front wheel 11 side and the rear wheel 12 side can be supported by the body frame 16. Therefore, where a rigidity of a predetermined magnitude is to be provided to the body frame 16, the material thickness of the body frame 16 can be reduced to achieve reduction of the weight. Consequently, the weight of the bicycle 10 can be reduced. As a result, the motion performance of the bicycle 10 can be augmented. Further, also damage that may be provided to several portions of the bicycle 10 during running on a rough load can be reduced and the durability of the bicycle 10 can be augmented.

According to a fourth characteristic of the present invention, a saddle frame 56 on which a saddle 28 is supported is mounted at the rear end of the twin tube portion 52 and the rear frame portion 53, and the rear cushion unit 15 is disposed below the saddle frame 56. Since the rear cushion unit 15 is disposed below the saddle frame 56, the rear cushion unit 15 is surrounded by the saddle frame 56, which substantially covers the entire upper surface and part of the sides of the rear cushion unit 15, and the rear frame portion 53, which covers the sides and the bottom of the rear cushion unit 15. Consequently, the rear cushion unit 15 can be protected from a foreign debris and matter.

It will be appreciated that the body frame structure of the present invention has been described in connection with a bicycle frame, however, the present invention is equally applicable to other vehicles such as a motorcycle, particularly a vehicle for an off road application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body frame structure for a vehicle comprising:
   a body frame having a front fork at a front portion of the body frame;
   a swing arm being mounted for an upward and downward swinging movement at a rear portion of said body frame;
   a head pipe on which said front fork is mounted for permitting a turning movement;
   a box-shaped box frame portion extending obliquely rearward and downward from said head pipe;
   a twin tube portion having twin tubes extending obliquely downward and rearward separately on the left and right, respectively from a rear end of said box frame portion, wherein a width of the twin tube portion is smaller than a width of said box frame portion; and
   a rear frame portion extending obliquely rearward and downward from rear ends of said twin tubes of the twin tube portion, wherein said rear frame portion has a width greater than the width of said twin tube portion and a thickness of said rear frame portion is smaller than a thickness of said twin tube portion in side view.

2. The body frame structure according to claim 1, further comprising a mounting portion for said swing arm being provided at a substantially middle portion of said rear frame portion.

3. The body frame structure according to claim 2, wherein said swing arm is a substantially L-shaped member having an upright portion extending obliquely rearward and upward from said mounting portion.

4. The body frame structure according to claim 3, further comprising:
   a rear extension extending obliquely rearward and downward from an upper end of said upright portion of said swing arm; and
   a connecting portion between said upright portion and said rear extension being connected to the rear end of said twin tube portion of said body frame through a rear cushion unit for damping an impact transmitted from said rear portion of said body frame.

5. The body frame structure according to claim 4, wherein said box frame portion, said twin tube portion, said rear cushion unit, and said rear extension are disposed along a substantially straight line in an axial direction of said body frame.

6. The body frame structure according to claim 5, further comprising:
   a saddle frame; and
   a saddle being supported by said saddle frame and being mounted at the rear end of said twin tube portion and said rear frame portion.

7. The body frame structure according to claim 6, wherein said rear cushion unit is disposed below said saddle frame.

8. The body frame structure according to claim 7, wherein said box-shaped box frame includes longitudinally extending transverse ribs formed in parallel to each other on a side face of the box frame portion of the body frame.

9. A vehicle having a body frame structure, said vehicle comprising:
   a body frame having a front fork at a front portion of the body frame;
   a swing arm being mounted for an upward and downward swinging movement at a rear portion of said body frame;
   a front wheel mounted for a steering movement at the front portion of the body frame through the front fork;
   a rear wheel mounted at a rear end of said swing arm;
   a head pipe on which said front fork is mounted for permitting a turning movement of said front wheel;
   a box-shaped box frame portion extending obliquely rearward and downward from said head pipe;
   a twin tube portion having twin tubes extending obliquely downward and rearward separately on left and right sides, respectively from a rear end of said box frame portion, wherein a width of the twin tube portion is smaller than a width of said box frame portion; and
   a rear frame portion extending obliquely rearward and downward from rear ends of said twin tubes of the twin tube portion, wherein said rear frame portion has a width greater than the width of said twin tube portion and a thickness of said rear frame portion is smaller than a thickness of said twin tube portion in side view.

10. The vehicle according to claim 9, further comprising a mounting portion for said swing arm being provided at a substantially middle portion of said rear frame portion.

11. The vehicle according to claim 10, wherein said swing arm is a substantially L-shaped member having an upright portion extending obliquely rearward and upward from said mounting portion.

12. The vehicle according to claim 11, further comprising:
    a rear extension extending obliquely rearward and downward from an upper end of said upright portion of said swing arm; and
    a connecting portion between said upright portion and said rear extension being connected to the rear end of said twin tube portion of said body frame through a rear cushion unit for damping an impact transmitted from said rear portion of said body frame.

13. The vehicle according to claim 12, wherein said box frame portion, said twin tube portion, said rear cushion unit, and said rear extension are disposed along a substantially straight line in an axial direction of said body frame.

14. The vehicle according to claim 13, further comprising:
    a saddle frame; and
    a saddle being supported by said saddle frame and being mounted at the rear end of said twin tube portion and said rear frame portion.

15. The vehicle according to claim 14, wherein said rear cushion unit is disposed below said saddle frame.

16. The vehicle according to claim 9, wherein said vehicle is a bicycle.

17. A body frame structure for a vehicle comprising:
a body frame having a front fork at a front portion of the body frame;
a swing arm being mounted for an upward and downward swinging movement at a rear portion of said body frame;
a head pipe on which said front fork is mounted for permitting a turning movement;
a box-shaped box frame portion extending obliquely rearward and downward from said head pipe, wherein said box-shaped box frame includes longitudinally extending transverse ribs formed in parallel to each other on a side face of the box frame portion of the body frame;
a twin tube portion having twin tubes extending obliquely downward and rearward separately on the left and right, respectively from a rear end of said box frame portion, wherein a width of the twin tube portion is smaller than a width of said box frame portion; and
a rear frame portion extending obliquely rearward and downward from rear ends of said twin tubes of the twin tube portion, said rear frame portion having a width greater than the width of said twin tube portion.

18. A vehicle having a body frame structure, said vehicle comprising:
a body frame having a front fork at a front portion of the body frame;
a swing arm being mounted for an upward and downward swinging movement at a rear portion of said body frame;
a front wheel mounted for a steering movement at the front portion of the body frame through the front fork;
a rear wheel mounted at a rear end of said swing arm;
a head pipe on which said front fork is mounted for permitting a turning movement of said front wheel;
a box-shaped box frame portion extending obliquely rearward and downward from said head pipe, wherein said box-shaped box frame includes longitudinally extending transverse ribs formed in parallel to each other on a side face of the box frame portion of the body frame;
a twin tube portion having twin tubes extending obliquely downward and rearward separately on left and right sides, respectively from a rear end of said box frame portion, wherein a width of the twin tube portion is smaller than a width of said box frame portion; and
a rear frame portion extending obliquely rearward and downward from rear ends of said twin tubes of the twin tube portion, said rear frame portion having a width greater than the width of said twin tube portion.

19. A body frame structure for a vehicle comprising:
a body frame having a front fork at a front portion of the body frame;
a swing arm being mounted for an upward and downward swinging movement at a rear portion of said body frame;
a head pipe on which said front fork is mounted for permitting a turning movement;
a box-shaped box frame portion extending obliquely rearward and downward from said head pipe;
a twin tube portion having twin tubes extending obliquely downward and rearward separately on the left and right, respectively from a rear end of said box frame portion; and
a rear frame portion extending obliquely rearward and downward from rear ends of said twin tubes of the twin tube portion, wherein said rear frame portion has a width greater than the width of said twin tube portion and a thickness of said rear frame portion is smaller than a thickness of said twin tube portion in side view.

20. A vehicle having a body frame structure, said vehicle comprising:
a body frame having a front fork at a front portion of the body frame;
a swing arm being mounted for an upward and downward swinging movement at a rear portion of said body frame;
a front wheel mounted for a steering movement at the front portion of the body frame through the front fork;
a rear wheel mounted at a rear end of said swing arm;
a head pipe on which said front fork is mounted for permitting a turning movement of said front wheel;
a box-shaped box frame portion extending obliquely rearward and downward from said head pipe;
a twin tube portion having twin tubes extending obliquely downward and rearward separately on left and right sides, respectively from a rear end of said box frame portion; and
a rear frame portion extending obliquely rearward and downward from rear ends of said twin tubes of the twin tube portion, wherein said rear frame portion has a width greater than the width of said twin tube portion and a thickness of said rear frame portion is smaller than a thickness of said twin tube portion in side view.

* * * * *